United States Patent [19]
Pahle

[11] Patent Number: 5,444,935
[45] Date of Patent: Aug. 29, 1995

[54] FISHING LURE WITH JET-STREAM HOLE AND DRIED BAIT PLUGS FOR INSERTION THEREIN

[76] Inventor: William E. Pahle, 203 Madera St., Ventura, Calif. 93003

[21] Appl. No.: 90,286

[22] Filed: Jul. 12, 1993

Related U.S. Application Data

[63] Continuation-in-part of Ser. No. 838,544, Feb. 19, 1992, Pat. No. 5,245,782.

[51] Int. Cl.⁶ .............................................. A01K 85/00
[52] U.S. Cl. ..................................................... 43/42.06
[58] Field of Search ................. 43/42.06, 42.32, 42.37, 43/42.34, 42.39, 42.33, 42.06

[56] References Cited

U.S. PATENT DOCUMENTS

| | | | |
|---|---|---|---|
| 1,639,863 | 8/1927 | Sinclair | 43/42.32 |
| 2,091,457 | 8/1937 | Sauer | 43/42.06 |
| 2,575,797 | 11/1951 | Corsi | 43/42.39 |
| 2,749,647 | 6/1956 | Beloff | 43/42.06 |
| 2,803,915 | 8/1957 | Zwiercan | 43/42.06 |
| 2,836,001 | 5/1958 | Silen | 43/42.06 |
| 2,854,780 | 10/1958 | Dege | 43/42.06 |
| 2,869,279 | 1/1959 | Pretorius | 43/42.06 |
| 3,073,054 | 1/1963 | Sherwood | 43/42.06 |
| 3,280,497 | 10/1966 | Tschida | 43/42.06 |
| 3,410,689 | 11/1968 | Nathan | 43/42.06 |
| 3,605,316 | 9/1971 | Rogers | 43/42.06 |
| 4,610,103 | 9/1986 | Steinman | 43/42.06 |
| 4,709,499 | 12/1987 | Ottaviano | 43/42.06 |
| 5,063,703 | 11/1991 | Riley | 43/42.06 |
| 5,097,620 | 3/1992 | Nietupski | 43/42.06 |
| 5,142,811 | 9/1992 | Freeman | 43/42.06 |
| 5,155,947 | 10/1992 | Rivard | 43/42.06 |

*Primary Examiner*—Kurt Rowan
*Attorney, Agent, or Firm*—Robert M. Wallace

[57] ABSTRACT

A fishing lure of the invention has a heavier-than-water lure body with a cavity in the lure body having at least one opening through the external surface, the opening being sized to permit insertion of a bait plug therethrough and into the cavity of a particular shape having a cross-section matching the opening, consisting of a substance which dissociates into material attractive to fish upon immersion underwater, such as dried chopped fish pressed together into the shape, the cavity being a jet-stream hole extending from between two openings, one of the openings permitting influx of water to dissociate the bait plug and the other of the openings permitting outflow of water containing material dissociated from the bait plug.

15 Claims, 4 Drawing Sheets

LEGEND

RED

ORANGE

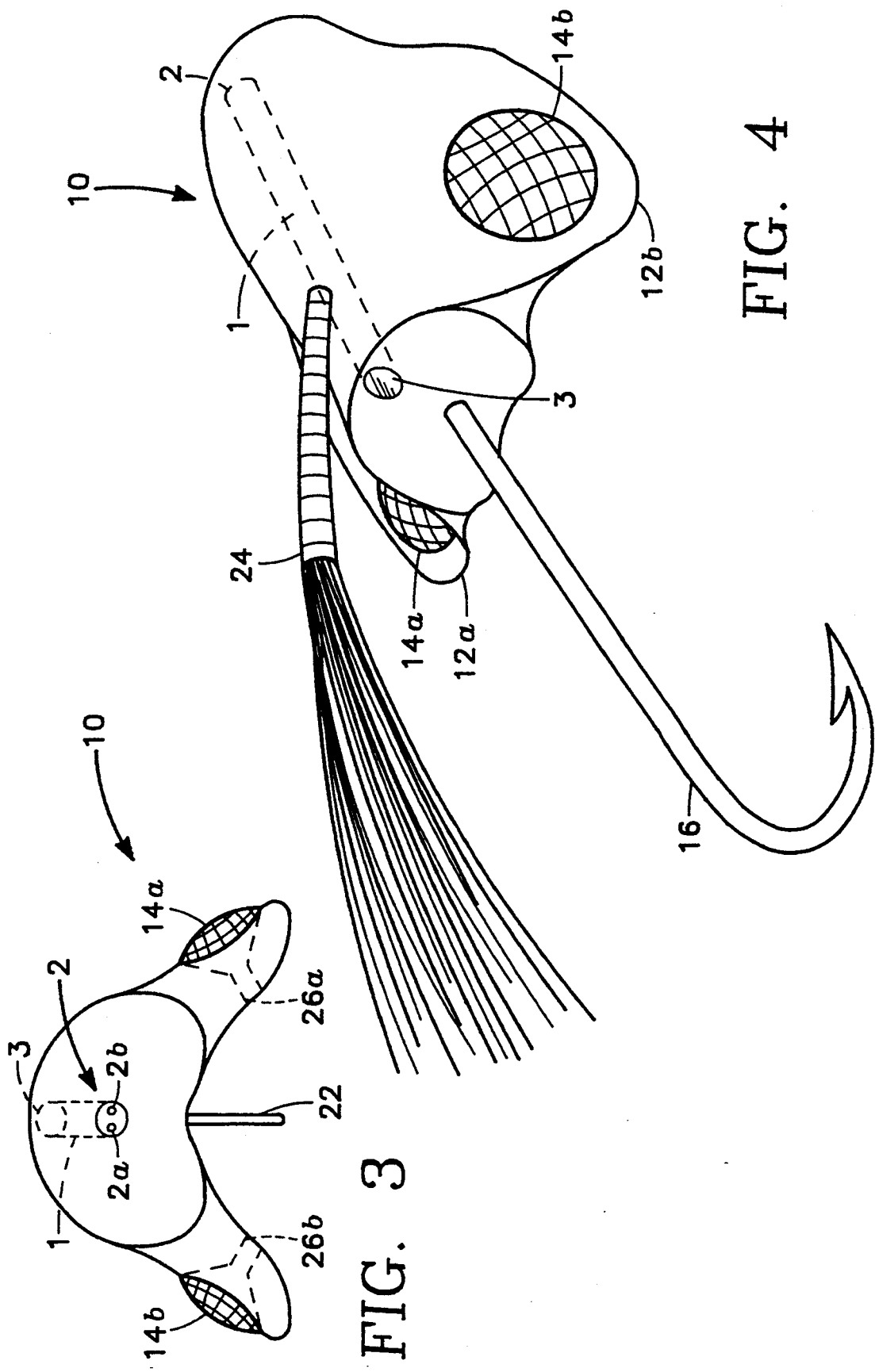

FISHING LURE WITH JET-STREAM HOLE AND DRIED BAIT PLUGS FOR INSERTION THEREIN

RELATED APPLICATIONS

This application is a continuation-in-part of U.S. patent application Ser. No. 07/838,544 filed Feb. 19, 1992, now U.S. Pat. No. 5,245,782, by William E. Pahle entitled FISHING LURE WITH SPLATTERED BLOOD SURFACE AND REFLECTIVE EYES IN DROOPING SIDE WINGS.

BACKGROUND OF THE INVENTION

1. Technical Field

The invention is related to fishing lures and particularly to fishing lures for fishing in waters where the fish have been saturated with bait and are not biting.

2. Background Art

An underwater fishing lure is best used with bait hooked thereon to attract fish. Such bait is typically meat taken from other sea life. One requirement is that the meat hooked onto the lure must be of the type which has some tendency to stay on the hook despite drag from motion relative to the water. One example of such bait is squid. The problem with this type of bait is that it becomes saturated with salt water after several minutes of use and losses its peak aromatic power to attract fish to the lure. Other more strongly aromatic bait (such as anchovy) is too prone to falling off the hook due to its tendency to easily tear.

Another problem associated with bait is the amount of wasted time consumed in baiting and re-baiting hooks while fishing. Another problem is that on long fishing trips, the bait looses its freshness and therefore it aromatic power before it is actually used by the fisherman.

A further problem is that many persons are nauseated by the smell and gory sight of bait while having to hook it onto the lure, particularly after they have injured their fingers on the hook, so that a large proportion of the population who would otherwise enjoy the sport of fishing simply will have nothing whatsoever to do with it.

Fishing lures of various designs for achieving hydrodynamic effects and outer appearance most attractive to a fish are well known. For example, a fishing lure having a mottled appearance is disclosed in U.S. Pat. No. 2,036,075. A fishing lure having a pair of planar parallel wings each supporting an eye is disclosed in U.S. Pat. No. 4,827,660. A fishing lure having a brush feather attached to the lure and pointing toward the point of the hook is disclosed in U.S. Pat. No. 2,112,180.

The problem with these lures is that they all have limited performance, particularly in waters where the fish are already well-fed or in bait-saturated waters. What is needed is a lure that compels the fish to bite under any circumstance.

SUMMARY OF THE DISCLOSURE

In one embodiment, the invention is fishing kit including a heavier-than-water lure body having an external surface, a cavity in the lure body having at least one opening through the external surface, the opening being sized to permit insertion of a bait material therethrough and into the cavity. The kit further includes a bait plug of a particular shape having a cross-section matching the opening. The bait plug consists of a substance which dissociates into material attractive to fish upon immersion underwater. The material, in one implementation, includes dried chopped fish pressed together into the shape. The cavity includes a jet-stream hole having a second opening, the jet-stream hole extending from the one opening to the second opening, one of the openings permitting influx of water to dissociate the bait plug and the other of the openings permitting outflow of water containing material dissociated from the bait plug. The openings face in generally opposing directions. The lure has a streamline shape which tends to face one of the openings in the direction of travel of the lure whenever the lure is dragged underwater. The one opening tends to face in a direction opposite to the direction of underwater travel of the lure. The second opening faces the direction of travel and is an intake opening preferably including at least one orifice smaller than the jet-stream hole. In one embodiment, the bait plug has a hole extending completely through the interior thereof to increase a tendency thereof to disassociate upon immersion in water. Preferably, the jet-stream hole has an elongate cylindrical shape and the bait plug has a shape congruent with the jet-stream hole. The substance of the bait plug tends to expand upon immersion in water, whereby to tightly hold the bait plug in the cavity as it looses material upon disassociation underwater.

In another embodiment, the invention is a dry bait plug for insertion into a cavity in a fishing lure, the bait plug including a substance which dissociates into material attractive to fish upon immersion underwater. In one implementation, the material includes dried chopped fish pressed together into the shape. The cavity has a particular shape and the bait plug has a shape congruent with the particular shape. Preferably, the shape is that of an elongate cylinder. Preferably, the bait plug includes dried water-disassociatable material pressed together into the shape.

In still another embodiment, the invention is a fishing kit including a waterproof pouch containing plural bait plugs for insertion into a cavity in a fishing lure, each of the bait plugs including a substance which dissociates into material attractive to fish upon immersion underwater. The fishing kit further includes a waterproof removable flap covering an opening of the pouch. The waterproof pouch is wearable on a garment of a fisherman. In one embodiment, the material includes dried chopped fish pressed together into the shape. The cavity has a particular shape and the bait plug has a shape congruent with the particular shape. The shape is preferably that of an elongate cylinder. Preferably, the bait plug includes dried water-disassociatable material pressed together into the shape. The substance of the bait plug tends to expand upon immersion in water, whereby to tightly hold the bait plug in the cavity as it looses material upon disassociation underwater.

In a still further embodiment, the invention is a fishing lure including a lure body having a cavity therein for receiving a water-disassociatable bait plug. Preferably, the lure body has an exterior surface bearing a splattered pattern. The splattered pattern, in one embodiment, includes a plurality of spots on a light background, the spots radiating from a center region on the surface in a quasi-random distribution, the spots having increasing spacing therebetween and decreasing spot size with increasing distance from the center region.

BRIEF DESCRIPTION OF THE DRAWINGS

FIG. 3 is a front view corresponding to FIG. 1.

FIG. 4 is a perspective top view corresponding to FIG. 1.

DETAILED DESCRIPTION OF THE INVENTION

Introduction

Figure 1:
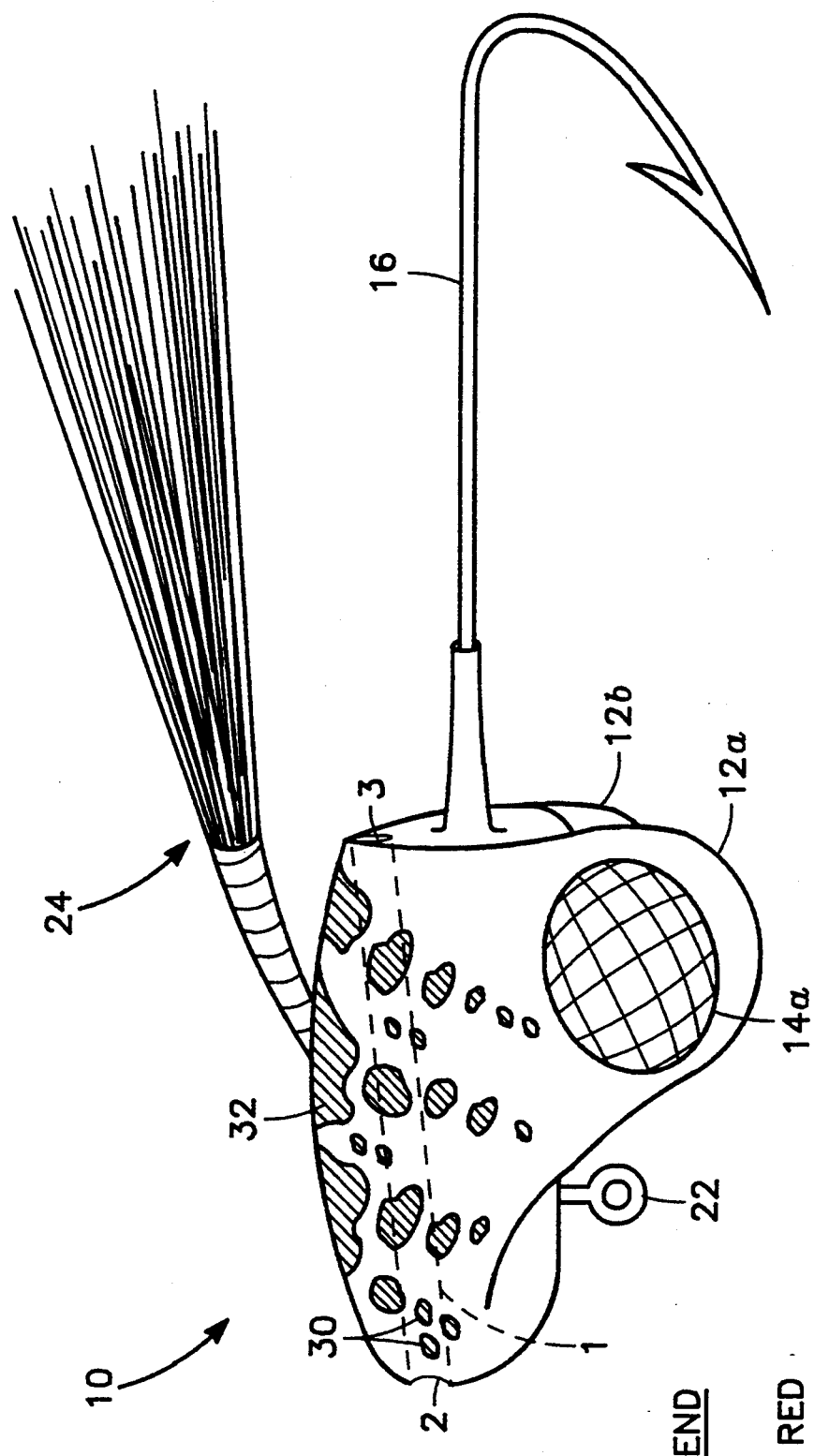
FIG. 1 is a side view of the preferred embodiment of the invention.

The invention solves the problems associated with bait by providing a lure having a streamline shape which orients the lure body front surface toward the direction of underwater travel. A small cylindrical jet-stream hole in the lure body has in intake opening at the lure body front surface and an outflow opening at a rear surface of the lure body, the cylindrical jet-stream hole extending through the lure body in a straight line in the general direction of underwater travel of the lure. The invention further includes a supply of cylindrical dried bait plugs having a radius and axial length corresponding to that of the jet-stream hole in the lure body, so that a single bait plug is readily inserted into the jet-stream hole, like inserting a bullet into the chamber of a revolver. The dried bait plugs may be any suitable substance such as dried fish particles of the type employed in instant soup, for example. As such, the bait plugs may be carried in a packet on the fisherman's shirt all day without loosing their freshness. Furthermore, many lures can be baited with the dry bait plugs in this manner beforehand, and then used one-by-one to save time while the fish are striking.

The invention is also useful with conventional lures, for example lures of the type using live bait. The dried bait plug inserted in the jet stream hole in the lure body enhances the performance of the lure by compounding or supplementing the aromatic attraction offered by the live bait with that of the dry bait plug.

After a lure of the invention "armed" with a bait plug in its jet-stream hole is submerged underwater, water gradually dissolves the bait plug substance while simultaneously causing the bait plug to expand, holding it snugly in the jet-stream hole. As the lure is dragged through the water, the dissolved fraction of the dried bait plug substance flows out of the rear opening of the jet-stream hole and fills the water with dissolved bait which attracts fish to the trail of the lure. The tendency of the bait plug to dissolve may be enhanced in one embodiment by providing a small elongate hole extending through the bait plug along the cylindrical axis thereof.

I have discovered that fish respond most strongly to a lure having a blood-splattered appearance, most resembling a wounded marine animal. A fishing lure embodying the invention has a lead head whose outer surface has a light colored (e.g., yellow) background with a splattered pattern over the background, preferably of red color so that the pattern is that of splattered blood. As a result of the dramatic success enjoyed through use of the present invention, it is surmised that the genetic predatory behavior of fish includes a simple pattern recognizer keyed to a blood splattered appearance, which is fully stimulated by the present invention as no lure before has ever done.

The lure flies through the water with a pair of drooping side wings integrally formed with the lead head, each drooping wing having a multi-faceted sunlight-reflective eye mounted in its outer surface with a light-transmissive hole to the eye extending from the inner surface of the wing, so as to attract fish too far away to discern the blood splattered pattern. Each eye reflects light received from either the front of the eye or from the rear through the light-transmissive hole. The wings enable the lure to ascend and descend realistically in straight-line paths and to glide in a horizontal path. The drooping aspect of the wings enables the eyes to be seen from either side of the lure as well as from the top and bottom of the lure. However, the drooping aspect of the wings may also reduce the roll stability of the lure. In order to provide greater roll stability, a brush tail extends upwardly from the body of the lead head away from the hook point and, by virtue of its upward attitude, acts as a stabilizing rudder for the lure as it flies through the water.

The brush tail, by extending upwardly away from the hook, leaves a fish (scampi) replica impaled on the hook free to flutter its artificial tails as the lure moves through the water. Furthermore, the upward pointing brush tail takes on the appearance of a dorsal fin, further enhancing the attraction of the lure. Another feature of the invention which increases the lure's stability and increases the water flow to the fluttering tails of the artificial scampi replica is a smooth concavity in the bottom surface of the lure. Preferably, the bottom surface is spherically concave up to one-third the height of the lure at the maximum point of concavity.

The lure operates as follows: as the fish views the lure flying nearly horizontally through the water from either the side or from the top of the lure, it sees the light reflected by at least one of the eyes in the wings and it also sees the blood splattered pattern on the surface of the lure body. As the fish moves toward the lure for a strike, its nose is tickled at the penultimate moment by the distal end of the brush feather, and at this point the fish bites down hard on the hook. Preferably, a flexible plastic replica of the type well-known in the art of the rear half of a scampi is slid over the hook and attracts the fish toward the hook.

Preferred Embodiments

Referring to FIGS. 1-4, the preferred embodiment of the invention includes a jet-stream hole 1 extending through a lure body 10, preferably an integrally formed body of lead, for example. The lure body is formed of a material such as lead which is heavier than water so that the lure will sink to any desired depth when immersed underwater. The jet stream hole 1 is cylindrical and extends from a water intake opening 2 on the front surface 10a of the lure body 10 to an out-flow opening 3 on the rear surface 10b of the lure body 10. The lure body 10 has a streamline shape as shown in the drawings so that it tends to orient itself when dragged under water with the front surface 10a facing the direction of travel and the rear surface 10b facing away from the direction of travel. An axially elongate cylindrical bait plug 4 consisting of, for example, dried finely chopped fish, is quickly inserted by the user through the rear opening 3 into the jet-stream hole 1 prior to dropping the lure into the water. As illustrated in FIG. 3, the front opening 2 of the jet-stream hole 1 consists of two small holes 2a, 2b in the preferred embodiment. This reduces the water pressure exerted on the bait plug 4, thereby reducing the tendency to push the plug 4 out through the rear opening 3. However, other opening designs may be employed in carrying out the invention. For example, the front opening 2 may be a single hole concentric with and having the same diameter as the main jet-stream hole 1. As illustrated in FIG. 4, the rear opening 3 of jet-stream hole 1 has the same diameter as the hole itself. This tends to avoid plugging of the rear opening 3 by dissolved debris from the bait plug 1, thus ensuring a free flow of dissolved bait particles out through the rear opening 3.

In use, a fisherman carries a waterproof pouch 5 (on his jacket or shirt, for example) containing a number of bait plugs 4, and withdraws one of the plugs 4 from the pouch to insert through the rear opening 3. The pouch is sealed with a waterproof flap 6.

The bait plugs 4 in the pouch 5 may be of various types. As already disclosed above, the bait plugs may be formed of dried chopped fish particles pressed together into the cylinder which is readily inserted into and fits snugly in the jet-stream hole 1. Alternatively, the bait plug 4 may consist of a synthetic substance pressed together into the same cylindrical shape. Or, the bait plug 4 may be any substance mixed with oil (such as fish oil) and pressed together in the same cylindrical shape. Preferably, the bait plug 4 is formed of a substance pressed together which tends to break up into small particles in the presence of water. Furthermore, it is preferable that the substance be of the type which tends to expand upon contact with water, such as dried chopped fish of the type used in instant soup mixes. Also, it is preferable that the substance emit an aroma into the water upon contact therewith which is attractive to fish, drawing fish to the trail of the lure as it is dragged through the water.

As one possibility, the jet-stream hole 1 may simply be filled with fish oil. In this case, the rear opening 3 would be like the front opening 2 in that it would preferably consist of one or two (possibly more) very small sub-openings such as the sub-openings 2a, 2b.

Figure 2:
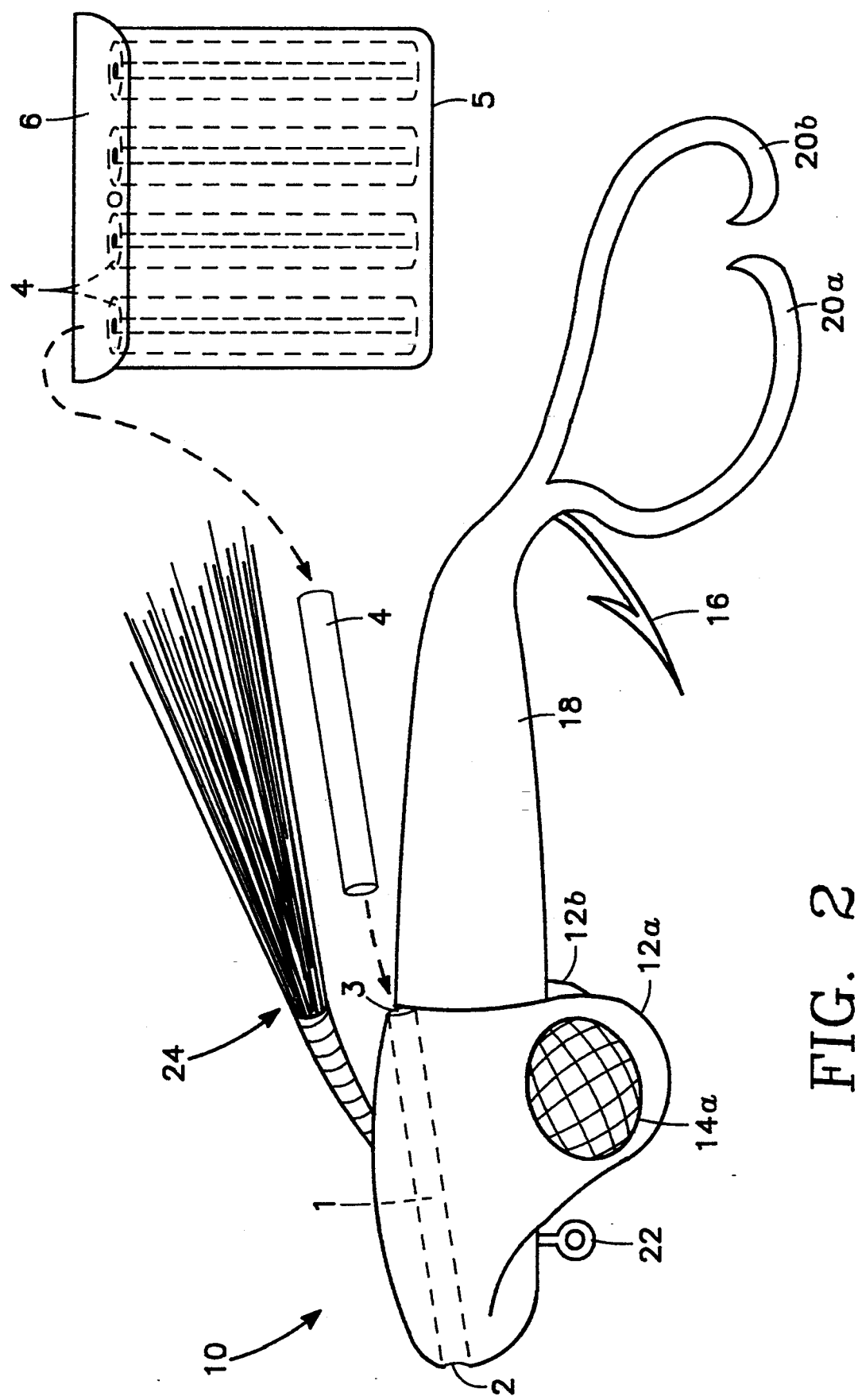
FIG. 2 is a side view corresponding to FIG. 1 showing how the flexible scampi replica is mounted on the hook.

In order to enhance the break-up or dissolution of the substance of the bait plug 4 as the lure is dragged underwater, a hole 7 may be provided through the axial center of the bait plug 4, as shown in FIG. 2.

While the invention has been described with reference to a preferred embodiment in which the bait plug 4 and jet-stream hole 1 are both matching cylindrical shapes, the invention may be implemented with any other suitable shapes, such as triangular or square cross-sections or even symmetrical shape such as spheres.

A pair of wings 12a, 12b integrally formed with the body 10 droop down slightly from the body 10, each supporting a multi-facet reflective eye 14a, 14b of the type well-known in the art. A fish hook 16 extends out the back end of the body 10 and curves downwardly to a sharp point. As shown in FIG. 2, the hook 16 receives a realistically flexible replica of the rear half of a scampi 18. As is well-known in the art, the tails 20, 20b of the scampi replica actually flutter as the lure body 10 is drawn through the water by a fishing line (not shown) attached to an eyelet 22 of the body 10. The rounded nose 10a of the body 10 and the drooping wings 12a, 12b provide the requisite hydrodynamic characteristics for "flying" through the water. A brush feather 24 is attached at its head to the top of the lure body 10 and extends upwardly away from the hook 16, and in this configuration performs two functions. First, it acts as a rudder stabilizer for the lure and second it stimulates the fish's nose at it nears the hook 16. The multi-faceted eyes 14a, 14b receive light through their front surfaces as well as through light transmissive chambers 26a, 26b in the back surfaces of the wings 12a, 12b, and internally reflect the light among their multi-faceted surfaces for maximum return of light toward the observer. The drooping aspect of the wings 12a, 12b renders the eyes 14a, 14b visible from the side of the lure, so as to increase the visibility of the lure.

The bottom surface of the lure body 10 is spherically concave, as indicated in hidden line in the side view of FIG. 1, up to about one-third the height of the lure body 10 at the peak 10a of concavity.

Figure 5:
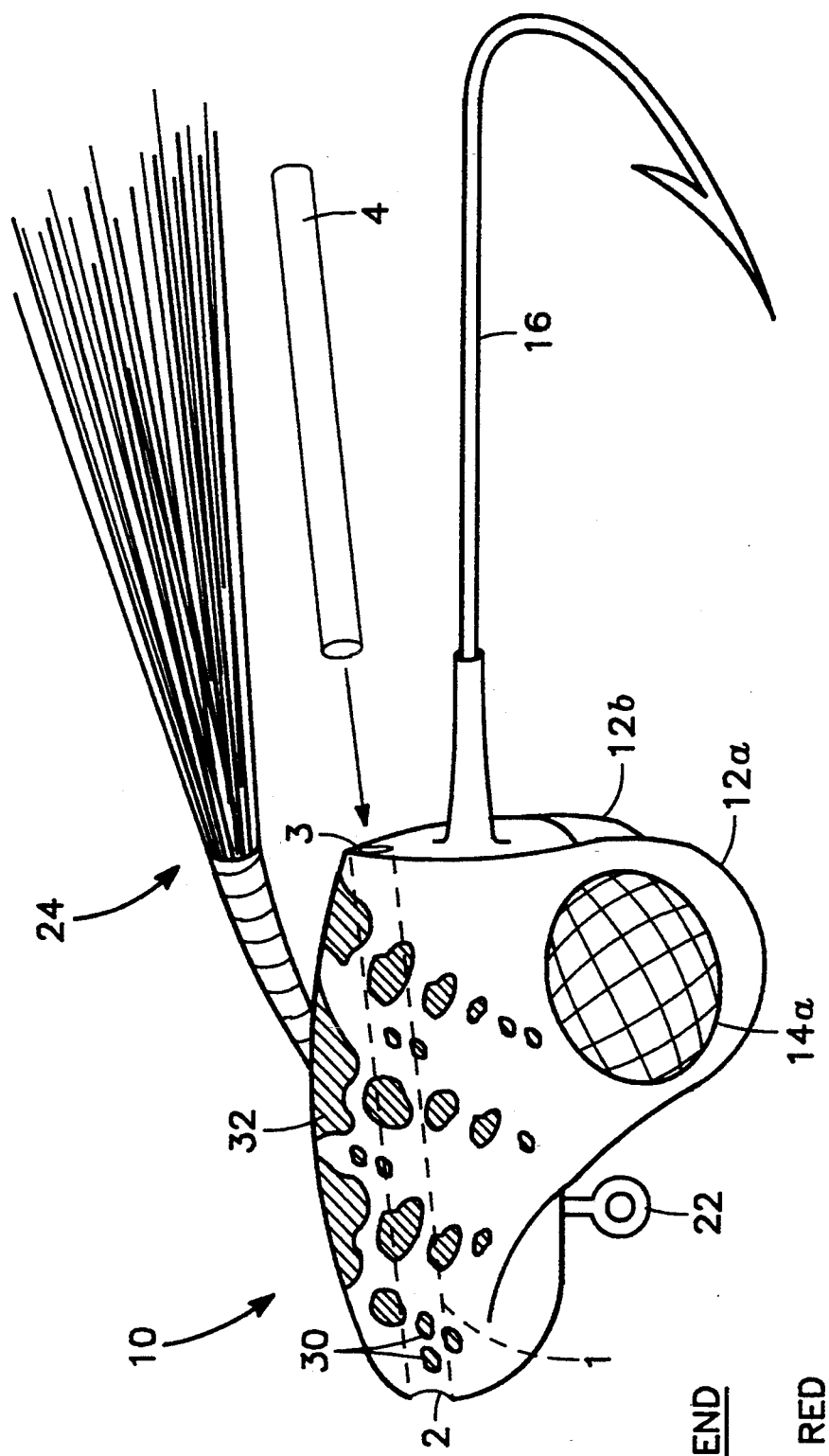
FIG. 5 is a side view of an alternative embodiment of the invention having a darker background color than FIG. 1 for the blood splattered pattern.

The blood splattered pattern consists of red painted spots 30 of decreasing radii and increasing spacing from a center region 32 from which the spots radiate in a quasi-random distribution, as the term "splattered" is understood in this specification. This effect is best attained by splattering red paint on the surface of the lure 10. Preferably, the background is yellow although it may be orange as illustrated in FIG. 5. The blood-splattered pattern of the invention is superior to the mottled pattern of U.S. Pat. No. 2,036,075 because it is a more realistic resemblance to a wound on a marine animal and it is my discovery that the fish's predatory behavior is stimulated more by the blood-splattered lure than a mottled lure.

While the invention has been described by specific reference to preferred embodiments thereof, it is understood that variations and modifications thereof may be made without departing from the true spirit and scope of the invention.

What is claimed is:

1. A fishing lure comprising: a lure body having a cavity therein for receiving a water-disassociatable bait plug, said cavity having at least one opening sized to permit insertion of a cylindrical bait plug therethrough and into said cavity;

wherein said cavity comprises a cylindrical jet-stream hole having a second opening, said jet-stream hole extending from said one opening to said second opening, one of said openings permitting influx of water to dissociate said bait plug and the other of said openings permitting outflow of water containing material dissociated from said bait plug, said cylindrical jet-stream hole and said first opening having at least nearly equal diameters, a pair of sloping wings extending non-horizontally with respect to a line of flight of said lure through water and a reflective eye in each of said wings, said fish hook extending in a direction corresponding to that of said sloping wings, and light transmissive chambers extending from the rear of each of said eyes to a back surface of each of said wings, whereby to admit light rearwardly into each of said eyes.

2. The fishing lure of claim 1 wherein said lure body has an exterior surface bearing a splattered pattern.

3. The fishing lure of claim 1 wherein said splattered pattern comprises a plurality of spots on a light background, said spots radiating from a center region on said surface in a quasi-random distribution, said spots having increasing spacing therebetween and decreasing spot size with increasing distance from said center region.

4. The fishing lure of claim 3 wherein said splattered pattern comprises a red splattered pattern on a light colored background so as to provide a blood splattered appearance.

5. The fishing lure of claim 1 wherein said wings slope downwardly with respect to said line of flight, whereby said eyes are visible to an observer from one side of said lure.

6. The fishing lure of claim 1 wherein said eyes are multi-faceted eyes whereby to create internal reflections of light received from said light transmissive chambers or from frontal surfaces of said eyes.

7. The fishing lure of claim 1 further comprising a brush feather means extending upwardly from a top surface of said lure body in a plane of said hook and extending away from said hook, whereby to provide a rudder stabilization function during travel of said lure body through water.

8. The fishing lure of claim 7 further comprising a flexible fish model impaled on said hook, said fish model having plural tail tips which flutter in response to water flow past said lure.

9. The fishing lure of claim 1 wherein said lure body has a front nose having a rounded hydrodynamic profile, said fishing lure further comprising a concave bottom surface.

10. A fishing lure comprising: a lure body and a pair of drooping wings extending from said lure body non-horizontally with respect to a line of flight of said lure body through water and an eye in each of said wings, and a fish hook extending from said lure body in direction corresponding to that of said drooping wings, said lure body having a cavity therein for receiving a water-disassociatable bait plug, said cavity having at least one opening sized to permit insertion of a cylindrical bait plug therethrough and into said cavity;

wherein said cavity comprises a cylindrical jet-stream hole having a second opening, said jet-stream hole extending from said one opening to said second opening, one of said openings permitting influx of water to dissociate said bait plug and the other of said openings permitting outflow of water containing material dissociated from said bait plug, said cylindrical jet-stream hole and said first opening having at least nearly equal diameters, and light transmissive chambers extending from the rear of each of said eyes to a back surface of each of said wings, whereby to admit light into the rear end of each of said eyes.

11. The fishing lure of claim 10 wherein said wings droop downwardly with respect to said line of flight, whereby said eyes are visible to an observer from one side of said lure.

12. The fishing lure of claim 10 wherein said eyes are multi-faceted eyes whereby to create internal reflections of light from said light transmissive chambers.

13. The fishing lure of claim 10 further comprising a brush feather means extending upwardly from a top surface of said lure body in a plane of said hook but extending away from said hook, whereby to provide a rudder stabilization function during travel of said lure body through water.

14. The fishing lure of claim 13 further comprising a flexible fish model impaled on said hook.

15. The fishing lure of claim 10 further comprising a concave bottom surface.

* * * * *